UNITED STATES PATENT OFFICE.

CHARLES H. KERR, OF TARENTUM, PENNSYLVANIA, ASSIGNOR TO PITTSBURGH PLATE GLASS COMPANY, A CORPORATION OF PENNSYLVANIA.

POT FOR THE MANUFACTURE OF PLATE-GLASS AND THE METHOD OF MAKING THE SAME.

1,278,164.  Specification of Letters Patent.  Patented Sept. 10, 1918.

No Drawing.  Application filed December 18, 1916. Serial No. 137,698.

*To all whom it may concern:*

Be it known that I, CHARLES H. KERR, a citizen of the United States, residing at Tarentum, in the county of Allegheny and State of Pennsylvania, have invented certain new and useful Improvements in Pots for the Manufacture of Plate-Glass and the Method of Making the Same, of which the following is a specification.

The invention relates to the making of pots for plate glass making or walls for contact with molten glass, and has for its object the improvement of the product as set forth in my Patent No. 1,217,956 issued Mch. 6, 1917.

By the use of the procedure of the present applications which involve the use of finely divided silica (preferably secured by a grinding process), it is possible to make a pot or wall, which is more durable in furnace operations, which is less subject to losses during the forming and drying of the pot, and which gives a superior quality of glass than where ordinary relatively fine sand as it occurs in nature is used. It is also possible by the use of this exceedingly fine silica to utilize clays which it would be impossible to use with coarser sand or less finely divided silica and, it is possible to use as pot clay, a great many of the refractory plastic clays.

In my pending application referred to, .05 of an inch in diameter for the grains of silica was specified as the limit for coarseness. My present improvement contemplates the use of material whose grains for the major part are not over .005 of an inch in diameter. A much larger amount of the silica can be used when it is o. this finely divided character without any undue cracking of the pots during furnace operations or to a less extent in drying, as would be the case with coarser silica. As in the process of my pending application, the silica is very uniformly mixed throughout the clay and the procedure as to the forming of the pots or other walls is substantially the same as that pursued where ordinary clay is used.

The procedure followed in securing the finely divided silica is to grind pure glass sand between flint balls in a tube mill, but any other means might be employed for grinding the sand, or ground quartzite rock, or any other form of substantially pure silica, might be used in place of the sand. It might also be possible to use some of the infusorial earths consisting of silica which is readily pulverized to a very fine state. Following my preferred procedure, practically all of the material is ground until it is finer than .005 inch in diameter and more than 90% of it is finer than .0025 inch. A typical sieve test is represented by the following data, the sieves referred to being the former Tyler Standard Testing Sieve with size of hole as indicated in the table.

| Mesh. | Hole. | Per cent. partial residue. | Per cent. total residue. | Per cent. passing. |
|---|---|---|---|---|
| 60 | .0087 | 0.0 | 0.0 | 100.0 |
| 120 | .0043 | 1.7 | 1.7 | 98.3 |
| 200 | .00265 | 4.5 | 6.2 | 93.8 |

The foregoing is merely representative of the degree of fineness which I have found to be desirable. The material undoubtedly may be ground still finer with equal or greater success.

In some cases it may be desirable to use a quantity of coarser silica with the finer silica as above described. Such coarser material would be desirable in connection with clay which is otherwise so sticky as to be difficult to work. The addition of the coarser silica in addition to the finer silica in a case of this kind serves to reduce the stickiness, and serves to reduce the shrinkage of the mass, so that the pots will dry without cracking. There might also be necessity in some cases of using some of the coarser material to regulate the expansion and contraction of the mass to withstand furnace operating conditions. While my invention contemplates the use of the fine material, only, in most cases, it also contemplates the use of some coarser silica as above indicated in those cases where the quality of the clay makes it desirable.

I have found that the exceedingly fine material as above described may be used in greater quantity than the coarser unground sand or silica of corresponding coarseness, the total amount which may be added in some cases running as high as 50% of the total mixture of clay and silica. The range which can be used to greatest advantage lies between 15% and 45%, but even below 15% the addition of the finer silica has some advantage over the coarser silica, the advantage incident to the addition of the silica becoming less and less as the amount is reduced.

I have found that the mixture containing the finer silica fuses at a lower temperature than a corresponding mixture in which the silica is in a relatively coarse granular form, but this lowering of the fusing point does not involve any practical or factory disadvantage. The finer silica also produces a denser receptacle than the coarser silica, but this does not introduce objection from a practical operating standpoint and the greater density gives greater durability to the pot. The pot produced by the fine silica mixture is more durable than the coarse silica mixture, the washing away by the action of the glass being slower and more uniform, and the glass produced in the fine silica pots is superior to that produced in the coarse silica pots, the freedom from stone, string and ream being more marked.

What I claim is:

1. The process of making refractory walls for contact with molten glass which consists in mixing uniformly through plastic refractory clay a quantity of silica divided so finely that the major portion consists of grains less than .005 of an inch in diameter.

2. The process of making refractory walls for contact with molten glass which consists in mixing uniformly through plastic refractory clay a quantity of silica divided so finely that the major portion consists of grains less than .005 of an inch in diameter, and a large part of which consists of grains less than .0025 of an inch in diameter.

3. The process of making refractory walls for contact with molten glass which consists in mixing uniformly through plastic refractory clay a quantity of silica divided so finely that 90% of the silica consists of grains which are less than .005 of an inch in diameter.

4. The process of making refractory walls for contact with molten glass which consists in mixing uniformly through plastic refractory clay a quantity of ground silica divided so finely that the major portion consists of grains which are less than .0025 of an inch in diameter.

5. The process of making refractory walls for contact with molten glass which consists in mixing uniformly through plastic refractory clay a quantity of silica divided so finely that the major portion consists of grains less than .005 of an inch in diameter, the quanity of silica added to the clay constituting from 30% to 50% of the total mixture.

6. The process of making refractory walls for contact with molten glass which consists in mixing uniformly through plastic refractory clay a quantity of silica divided so finely that the major portion consists of grains less than .005 of an inch in diameter, and a large part of which consists of grains less than .0025 of an inch in diameter, the quantity of silica added to the clay constituting from 30% to 50% of the total mixture.

7. The process of making refractory walls for contact with molten glass which consists in mixing uniformly through plastic refractory clay a quantity of silica divided so finely that the major portion consists of grains less than .005 of an inch in diameter, the quantity of silica added to the clay constituting from 15% to 50% of the total mixture.

8. The process of making refractory walls for contact with molten glass which consists in mixing uniformly through plastic refractory clay a quantity of ground silica divided so finely that the major portion consists of grains which are less than .0025 of an inch in diameter, the quantity of silica added to the clay constituting from 30% to 50% of the total mixture.

9. A receptacle for the melting of glass formed by adding to plastic refractory clay and mixing uniformly therethrough a quantity of silica equal to from 30% to 50% of the total mixture, the silica being divided so finely that the major portion consists of grains which are less than .005 of an inch in diameter.

10. A receptacle for the melting of glass formed by adding to plastic refractory clay and mixing uniformly therethrough a quantity of silica equal to from 15% to 50% of the total mixture, the silica being divided so finely that the major portion consists of grains which are less than .0025 of an inch in diameter.

CHARLES H. KERR.

Copies of this patent may be obtained for five cents each, by addressing the "Commissioner of Patents, Washington, D. C."